US012800271B2

(12) United States Patent
Grant

(10) Patent No.: US 12,800,271 B2
(45) Date of Patent: Nov. 17, 2026

(54) STUN APPAREL AND DEVICES

(71) Applicant: Risen Stun Dynamics, LLC, Cincinnati, OH (US)

(72) Inventor: Gregory Grant, Cincinnati, OH (US)

(73) Assignee: Risen Stun Dynamics, LLC, Cincinnati, OH (US)

( * ) Notice: Subject to any disclaimer, the term of this patent is extended or adjusted under 35 U.S.C. 154(b) by 190 days.

(21) Appl. No.: 18/794,347

(22) Filed: Aug. 5, 2024

(65) Prior Publication Data

US 2025/0052546 A1 Feb. 13, 2025

Related U.S. Application Data

(60) Provisional application No. 63/517,983, filed on Aug. 7, 2023.

(51) Int. Cl.

*F41H 13/00* (2006.01)
*F41H 5/08* (2006.01)
*G08C 17/02* (2006.01)

(52) U.S. Cl.

CPC ........... *F41H 13/0018* (2013.01); *F41H 5/08* (2013.01); *G08C 17/02* (2013.01)

(58) Field of Classification Search

CPC ........ F41H 13/00; F41H 5/08; F41H 13/0018; F41H 13/0012; G08C 17/02; F41B 15/04; H01F 38/14
USPC .......................................................... 361/232
See application file for complete search history.

(56) References Cited

U.S. PATENT DOCUMENTS

| | | | | | |
|---|---|---|---|---|---|
| 6,961,227 | B1 * | 11/2005 | Whiton | A41D 13/008 | 361/232 |
| 2004/0264099 | A1 * | 12/2004 | Sikes | H05C 1/06 | 361/232 |
| 2006/0072280 | A1 * | 4/2006 | Nerheim | F41B 15/04 | 361/232 |
| 2007/0297117 | A1 * | 12/2007 | Elliott | F41A 33/02 | 361/232 |
| 2008/0278882 | A1 * | 11/2008 | Saliga | H05C 1/06 | 361/232 |
| 2008/0297970 | A1 * | 12/2008 | Rutz | H05C 1/06 | 361/232 |
| 2009/0284957 | A1 * | 11/2009 | Shemwell | F41H 13/00 | 362/109 |
| 2011/0013337 | A1 * | 1/2011 | Brown | F41H 5/08 | 361/232 |

(Continued)

*Primary Examiner* — Danny Nguyen

(74) *Attorney, Agent, or Firm* — Sheri Higgins Law, PLLC; Sheri Higgins

(57) ABSTRACT

A stun apparatus can include a shock box, wherein the shock box comprises: a housing; a positive terminal; a negative terminal; and a gas discharge tube comprising an input contact electrically coupled to an energy supply device and an output contact electrically coupled to the positive terminal, wherein when a voltage at the input contact becomes equal to or greater than a predetermined threshold voltage, an electrical current arcs within the gas discharge tube from the input contact to the output contact and causes an energy pulse to be delivered to the positive terminal or to a positive contact via the positive terminal, and wherein the shock box is configured to cause current to flow to the negative terminal or a negative contact through a person's body; and an article, wherein the shock box is attached to the article. The article can be a stun shield, belt, vest, or jumpsuit.

20 Claims, 6 Drawing Sheets

(56) References Cited

U.S. PATENT DOCUMENTS

| | | | | |
|---|---|---|---|---|
| 2020/0232768 | A1* | 7/2020 | Poplawski ....... | G08B 13/19602 |
| 2022/0207635 | A1* | 6/2022 | Hughes .................. | E05B 45/00 |

* cited by examiner

STUN APPAREL AND DEVICES

TECHNICAL FIELD

The field relates to a stun apparatus. The stun apparatus can be a stun shield, or clothing apparel such as a belt, vest, or jumpsuit. A shock box can be included in the clothing apparel and can be remotely activated.

BRIEF DESCRIPTION OF THE FIGURES

The features and advantages of the embodiments will be more readily appreciated when considered in conjunction with the accompanying figures. The figures are not to be construed as limiting any of the embodiments.

DETAILED DESCRIPTION

Figure 1:
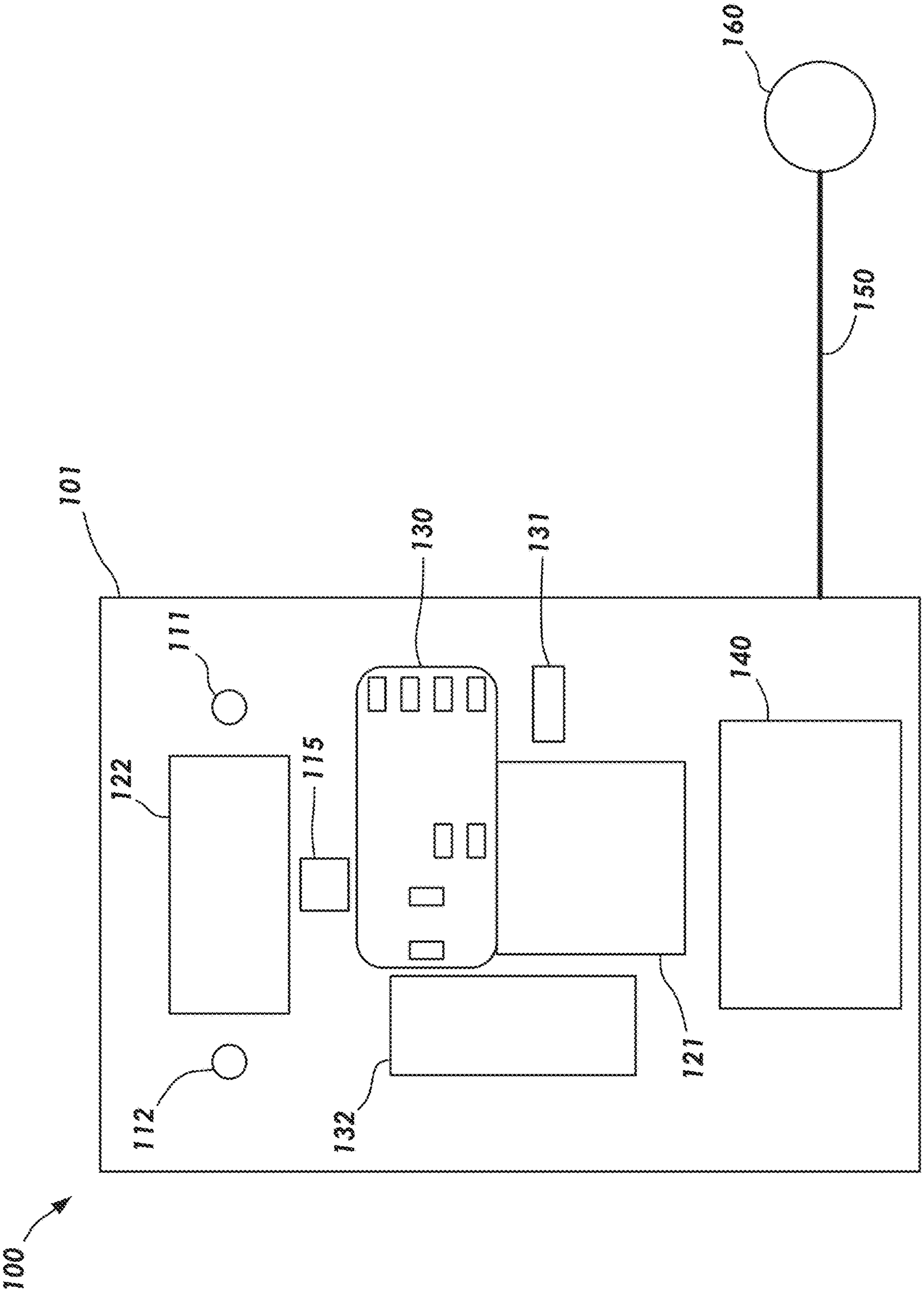
FIG. 1 is an illustration of a shock box according to certain embodiments.

Police departments and correctional facilities employ a variety of apparel and devices to provide non-lethal control of a person or inmate that poses a risk to an officer's life or safety. Without such devices and in the case where a violent encounter with a person or inmate is likely to occur, a hands-on encounter or use of lethal force with a weapon significantly increases the risk of injury or death to the inmate and/or the officer. Accordingly, electronic restraint/control devices have been in service for decades and are utilized by law enforcement and corrections agencies on an international level. The purpose of these devices is to provide a less-than-lethal force option that creates an opportunity to successfully mitigate an exigent situation and maintain control of a violent subject. In many instances, the presentation of such devices is a sufficient deterrent without the need to apply them beyond a visual display and verbal warning. These devices are invaluable to agencies because they support a mission to resolve a situation as safely as possible to all parties involved.

Such devices can be in the form of apparel, such as a stun vest, stun belt, or stun jumpsuits, or a device such as a stun shield. An inmate can be fitted with the stun vest, belt, or jumpsuit in a variety of situations, for example during transport within or to another facility or during court proceedings. An officer can use a stun shield in a variety of situations, for example to maintain crowd control in a facility or on streets during violent protests or riots.

Stun apparel can be activated with a remote control. The remote control is paired with a receiver on the apparel such that when the receiver receives a signal from the remote control, the person wearing the apparel is shocked or stunned. However current technology is prone to many problems. Once example of a problem with current technology is the analog frequency used is typically 400 megahertz (MHz) and is prone to interference from other devices running on the same frequency. This means that the device may not work when needed. Another example of a problem is the range between the apparel and the remote control can be limited, for example the remote control may need to be within 50 feet or less of the apparel in order to create the electric shock. Interference with metal bars in cells, concrete walls, etc. can also decrease the working range of the devices—in practice often reducing the range from 50 feet to 10 feet or less in order to work effectively. Another example of a problem is that pairing is currently accomplished by manually setting a master code and slave code that requires manual re-coding and creates a host of other problems.

Yet another significant disadvantage to current technology is how the arc is created to shock or stun a person. To create the shock, two metal rods are located adjacent to each other with a small space between the rods, similar to a spark plug, in which an electrical current jumps across the rods to create the pulse or stun cycling rapidly between on and off. However, the arcing causes the rods to corrode over time; thus, increasing the space between the rods, which decreases the pulse frequency. The rods also require maintenance to clean the corrosion and possibly requires replacing the entire device. Accordingly, there exists a long-felt need for new stun devices that solve the afore-mentioned problems.

It has been discovered that stun apparel can be activated using a remote control that changes the activation code each time the device is used and operates at a different frequency than current technology. This not only reduces the interference issues of current technology but also increases the range, prevents accidental activation, and ensures activation when needed. It has also been discovered that the metal rods that create the electrical arc can be housed within a gas discharge tube, thereby preventing corrosion, and solving the aforementioned problems.

A stun apparatus can include a shock box, wherein the shock box comprises: a housing; a positive terminal; a negative terminal; and a gas discharge tube comprising an input contact electrically coupled to an energy supply device and an output contact electrically coupled to the positive terminal, wherein when the voltage becomes greater than a predetermined threshold at the input contact, an electrical current arcs within the gas discharge tube to the output contact and the current is sent to the positive terminal or to a positive contact via the positive terminal; and an article, wherein the shock box is attached to the article, and wherein once the electrical current is sent to the positive terminal or the positive contact, the current is configured to flow to the negative terminal or a negative contact through a person's body, for example, a person's skin and/or tissues.

It is to be understood that the discussion of the various embodiments applies to all of the apparatus, system, and method embodiments without the need to repeat the various embodiments throughout. For example, any discussion related to the shock box applies to all of the apparatus, system, and methods and all of the articles disclosed (e.g., a shield, belt, vest, or jumpsuit) without the need to repeat the embodiments for each article.

Turning to the figures, FIG. 1 is an illustration of a shock box 100 according to any of the embodiments. The shock box 100 includes a housing 101. The housing 101 can have a square or rectangular shape for example and be made of metallic or non-metallic materials such as plastic. The housing 101 can be enclosed and house electrical components. The shock box 100 includes a positive terminal 111 and a negative terminal 112. A gas discharge tube (GDT) 115 can be located adjacent to the positive terminal 111 and the negative terminal 112. The gas discharge tube 115 can include an input contact electrically coupled to a snubber capacitor 132 and an output contact electrically coupled to a positive input of a pulse transformer 122. A spark gap is located between the input contact and the output contact. The input and output contacts can include rods that extend into the gas discharge tube 115 and are positioned with the spark gap between the rods. The gas discharge tube 115 can be filled with an inert gas including but not limited to helium, neon, argon, krypton, xenon, or radon. The gas discharge tube 115 and the inert gas can protect the input and output contacts from the environment, which reduces or eliminates degradation, for example via corrosion, of the input and output contacts. This advantageously means that the rods are not susceptible to coking, corrosion, or encountering wear points due to electrical arcing and environmental conditions. A feedback transformer 121 can be coupled to a negative input of the pulse transformer 122. A positive output of the pulse transformer 122 can be electrically coupled to the positive terminal 111 of the shock box 100. A negative output of the pulse transformer 122 can be electrically coupled to the negative terminal 112 of the shock box 100. Accordingly, when an energy pulse is received at a positive input of the pulse transformer 122 from the output contact of the gas discharge tube 115, the pulse transformer 122 can generate a transformed electrical pulse to the positive terminal 111, which will travel through the person's body to the negative terminal 112 that is electrically coupled to a negative output of the pulse transformer 122, thereby applying the transformed electrical pulse (i.e., a shock pulse) to the person's body.

The shock box 100 can include the feedback transformer 121, an energy supply device (e.g., a battery 140, a snubber capacitor 132), and the pulse transformer 122. Power from the energy supply device (e.g., a battery 140) can be supplied to the snubber capacitor 132 to charge the snubber capacitor 132 to a threshold voltage. Once the charge of the snubber capacitor 132 reaches the desired threshold voltage, the gas discharge tube 115 can arc between its input and output contacts, thereby delivering an electrical pulse to the pulse transformer 122. Once the electrical pulse is delivered through the gas discharge tube 115 to the pulse transformer 122, the snubber capacitor 132 will reduce its charge and will begin to recharge from energy supplied from the energy supply device. With the snubber capacitor 132 reduced below the threshold voltage, the gas discharge tube 115 will prevent further energy transfer to the pulse transformer 122. This cycle will repeat once the snubber capacitor 132 is charged to the threshold voltage again, causing another energy pulse to be delivered through the gas discharge tube 115 to the pulse transformer 122, and thereby to the person's body. The pulse transformer 122 can step up the voltage that is supplied to positive terminal 111 to a desired shock voltage. The energy supply, such as a battery 140, can be in a range, for example in the range of 6 to 13 volts (V). The voltage supplied from the pulse transformer 122 to the positive terminal 111 can vary, for example in the range of 10,000 to 50,000 V, depending on environmental conditions (e.g., humidity, temperature, etc.) and the energy supply (e.g., battery 140 voltage, state of charge, etc.). The actual voltage applied to the person can also vary based on a composition of the person's body (e.g., water level, pH level, or other characteristics that affect conductance through the person's body).

The shock box 100 can also include other electrical components such as resistors and capacitors 130 and a bipolar junction transistor (BJT) transistor 131. The resistors can be used to slow down the charge's movement by its resistance. The capacitors can store electrical potential energy that can be released to other components of the shock box 100. The BJT transistor 131 is a 3-terminal semiconductor that can be used to control the electrical current.

Figure 2C:
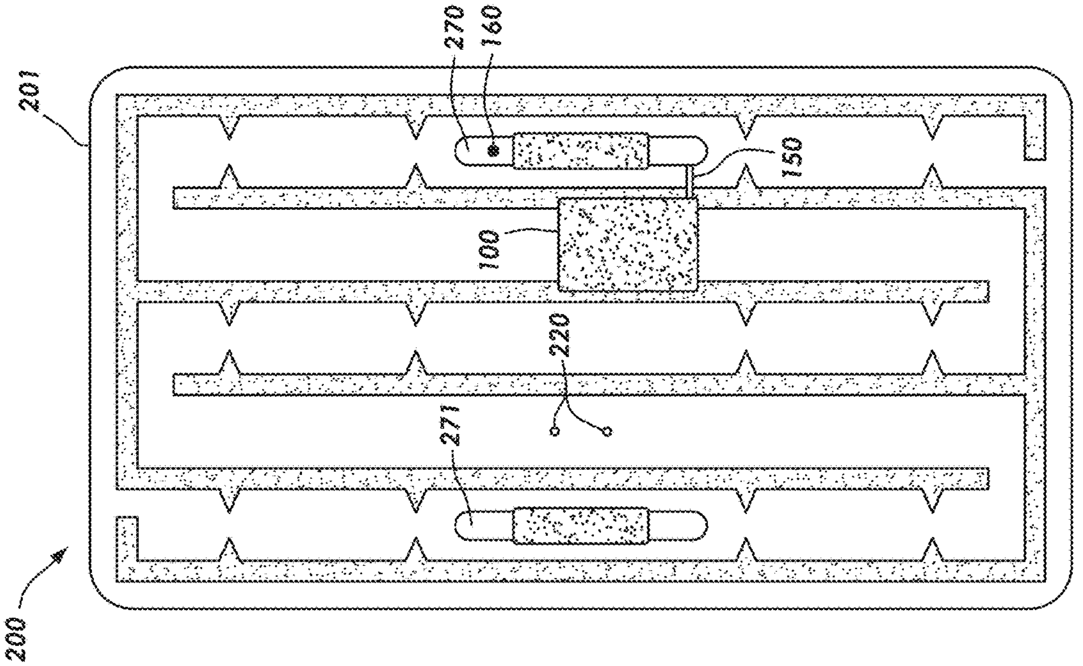
FIGS. 2A-2C are illustrations of the shock box of FIG. 1 attached to a stun shield according to certain embodiments.
Figure 2B:
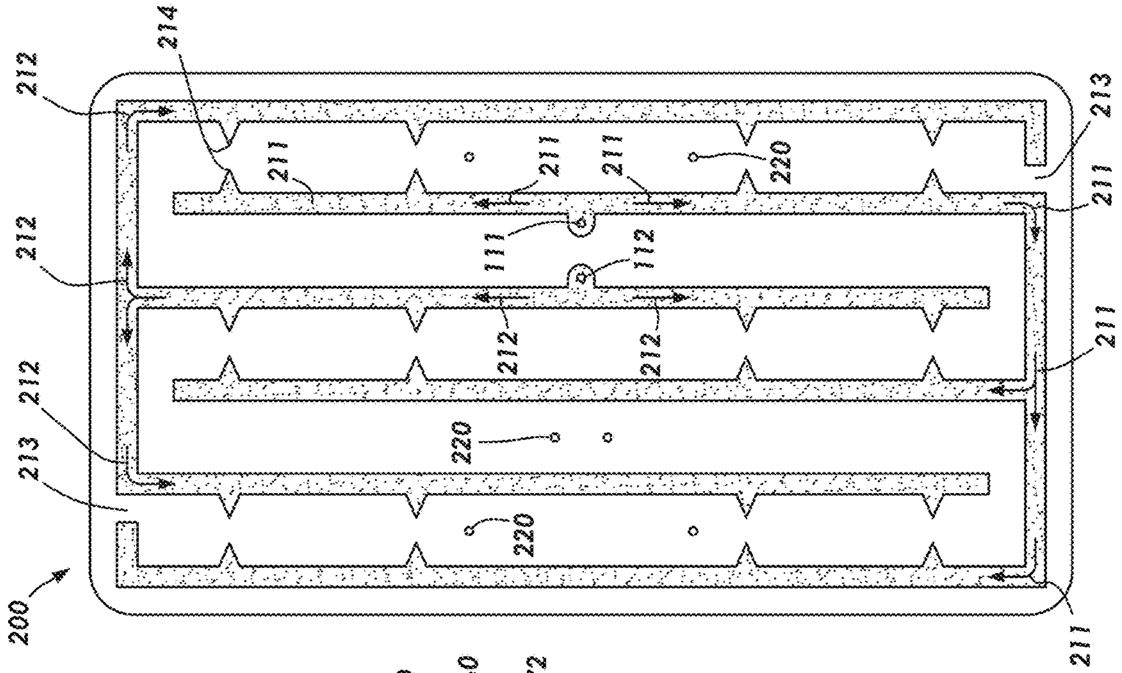
Figure 2A:
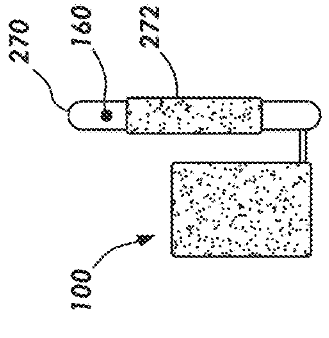

The stun apparatus also includes an article, wherein the shock box 100 is attached to the article. The shock box 100 can be removably attached to the article. As can be seen in FIGS. 2A-2C, the article can be a stun shield 200. The stun shield 200 includes a solid-surface shield 201 that can be made from a variety of materials. The material for the shield 201 can be a transparent or opaque material. Preferably, the material is transparent so an officer or user of the shield can see through the shield 201 to monitor people or a situation. Preferably the material is impenetrable to a solid object, such as a brick, being thrown at the shield or if the shield is hit with the solid object. The material can also be bulletproof or bullet resistant. By way of example, the material for the shield 201 can be a bulletproof or bullet resistant glass such as acrylic, polycarbonate, or insulated glass. The shield 201 can have a variety of dimensions with a width ranging from 1.5 to 5 feet and a height ranging from 2.5 to 7 feet, or a width of 1.5 to 2.5 feet and a height of 2.5 to 4.5 feet.

As can be seen in FIG. 2A, the shock box 100 can be electrically coupled to an activation switch 160 that is located on a handle 270 via a conductor 150. The shock box 100 can be permanently or removably attached to a back side of the shield 201, for example via screws and holes 220, at a variety of locations on the shield 201. The stun shield 200 can include a first and second handle 270/271. The switch 160 can be located on the first handle 270 or the second handle 271, or there can be two switches located on each of the first and second handles 270/271. If there are two switches 160 instead of just one switch, then both switches are electrically coupled to the shock box 100 via two conductors 150. In this manner, activation of the shock box 100 can occur from depressing either one or both of the switches 160. The first and second handles 270/271 can be permanently or removably attached to a back side of the shield 201, for example via holes 220, whereby a person, for example an officer, can use the handles to hold the stun shield in front of their body. All or a portion of the first or first and second handles can be covered with padding or a slip-resistant material 272. If the padding or slip-resistant material 272 is used, then the switch 160 should still be easily accessible so it can be pressed.

The shield 201 includes conductive strips in a pattern as shown or in other patterns such as a grid. A first set of strips can be connected in series and/or parallel to form a positive current path 211. A second set of strips can be connected in series and/or parallel to form a negative current path 212. It is preferrable that the strips for the positive current path 211 and the negative current path 212 do not touch or overlap with each other otherwise the current would short out. As can be seen, a space 213 can be used so the strips do not touch each other. However, it should be understood that the positive current path 211 and the negative current path 212 can overlap each other if they are insulated at the overlap to prevent arcing between the two paths 211, 212. Electrical current from the positive terminal 111 can flow through the positive current path 211. An arc point 214 can be located between a space between the positive current path 211 and the negative current path 212. If a person touches, or comes within an arc distance of, a portion of the strips of both the positive current path 211 and the negative current path 212, then the electrical current can arc through the person's body and flow through the negative current path 212 to the negative terminal 112. The stun shield 200 can also include other components, such as but not excluding strobe lights or other devices that are attached to the shield 201, for example via holes 220.

Figure 3:
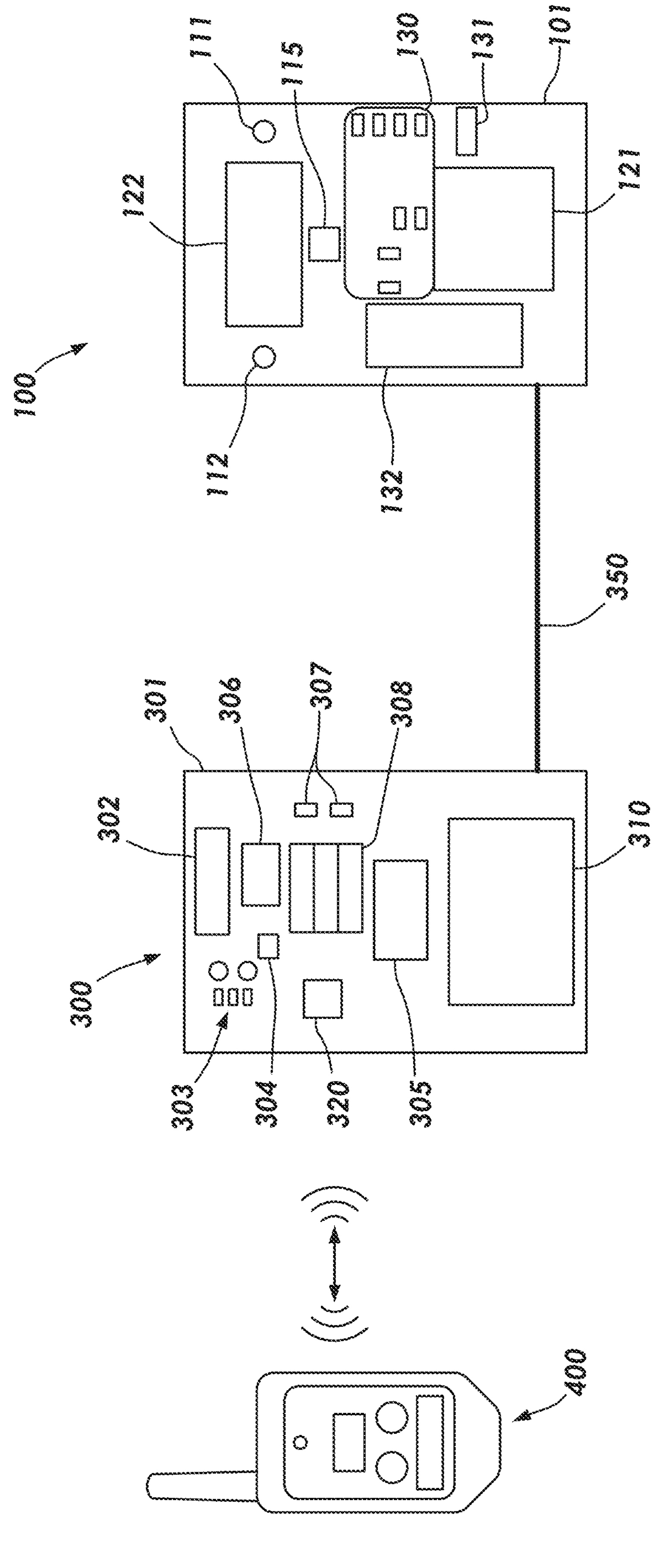
FIG. 3 is a schematic showing a shock box coupled to a receiver box and a remote transceiver according to certain other embodiments.

Turning to FIG. 3, the stun apparatus can further include a receiver box 300 in addition to the shock box 100. The receiver box 300 can be electrically coupled to the shock box 100 via a conductor 350. The receiver box 300 can include a housing 301 that is the same size or a different size than the shock box 100 and made from the same or different material than the shock box 100. The housing 301 can house electronic components such as but not limited to resistors and capacitors 303, a voltage comparator 304, a power relay 306, voltage regulators 307, and signal relays 308. The energy supply device, such as a battery 310 or plurality of batteries, can be housed within the receiver box 300 instead of the shock box 100. The receiver box 300 can further include an antenna 302 and a transceiver 305 such that the receiver box 300 can communicate wirelessly via any kind of wireless communication (e.g., BLUETOOTH®, radio frequency, ethernet wireless, etc.) with a remote transceiver 400 to transfer operational codes, pairing codes, activation commands, etc. between them.

The receiver box 300 receives input from the remote-control transmitter 400 and creates an output that drives a circuit that activates the signal relays 308 and supplies the energy to the shock box 100 from the battery 310. The circuit can be a timed circuit that is configured to only produce an electrical shock for a desired length of time, for example, 4 seconds, 8 seconds, or 10 seconds.

The remote-control transmitter 400 can be a handheld device that transmits a signal to the receiver box 300. The remote-control transmitter 400 can include a transceiver that can receive from and transmit to the receiver box 300 via the antenna 302 and transceiver 305. The remote-control transmitter 400 can include one or more buttons (not shown). One of the buttons can be an activation button. There can also be two activation buttons that must be pressed at the same time in order to send the signal to the receiver box 300. This embodiment can be useful to prevent unintentional activation of the shock box 100 and subsequent shocking to the person. A buzzer 320 can also be included in the receiver box 300 such that when the activation button(s) are pressed and the signal is sent, an audible tone is emitted to alert the person that the shock is eminent.

The remote-control transmitter 400 can be paired with the receiver box 300 such that wireless communication can occur between the remote control and receiver box. Another one of the buttons located on the remote control can be a test button. The test button can produce an audible test tone to indicate proper pairing. An initial pairing of one remote control to one receiver box can be performed to link the remote control with the receiver box. By way of another embodiment, one remote control can be initially paired with more than one receiver box. In this manner, more than one person wearing a stun vest, belt, or jumpsuit can be shocked with the same remote control. By way of another embodiment, there can be more than one remote control initially paired with one receiver box. In this manner, if one officer is unable to press the activation button on the remote, then another officer is able to shock the person with their remote control. Once the timed circuit has elapsed, for example after 6 seconds, then the receiver box 300 generates and sends a new code to the remote-control transmitter 400 and the process can be repeated as many times as is necessary in order to subdue the person. Alternatively, or in addition to, a new code can be generated and verified after each time one or more buttons are pressed or when buttons are pressed in a sequence on the remote-control transmitter 400.

The frequency used to wirelessly communicate from the remote-control transmitter 400 to the receiver box 300 and back can vary. According to any of the embodiments, the frequency is selected such that little to no interference is encountered when trying to activate the shock box 100. By way of a non-limiting example, the frequency can be 900 MHz. The frequency selected can significantly increase the range for being able to activate the shock box 100 over current technology, for example increasing the range to almost 1 mile versus 50 feet for current technology. According to certain embodiments, the range can be capped, for example to 10 or 20 feet, so an officer can visually see the wearer of the stun apparel.

After the initial pairing of the remote control(s) to the receiver box(es), a new pairing code is generated after each use (i.e., after the activation button(s) or the test button if included are pressed). The new code is generated from the receiver box 300 and transmitted via the transceiver 305 to the remote-control transmitter 400. When the activation button is pressed, then the remote-control transmitter 400 transmits the new code it received back to the receiver box 300, whereby the receiver box 300 confirms that the code sent back matches the code it generated. If the codes match, then the receiver box 300 supplies power to and sends the signal to the shock box 100 as discussed above. In this manner, unintentional activation of a particular shock box is inhibited or prevented by pressing the activation button on a different remote control because the codes would not match. Also, if a remote control is lost, then the code will no longer work because the lost remote would not have received the new code generated by the receiver box. The generation of a new code each time is a significant advantage over current technology.

Figure 4:
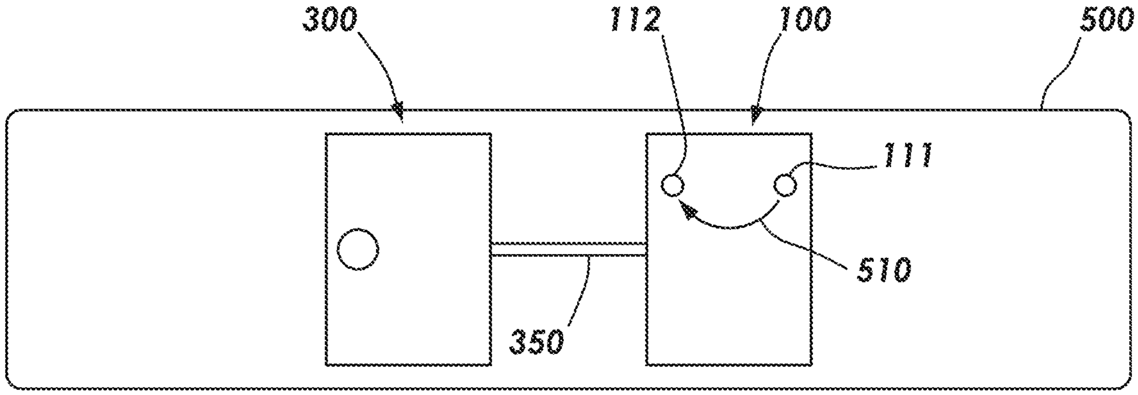
FIG. 4 is an illustration of the shock box and the receiver box of FIG. 3 attached to a stun belt according to certain embodiments.
Figure 5A:
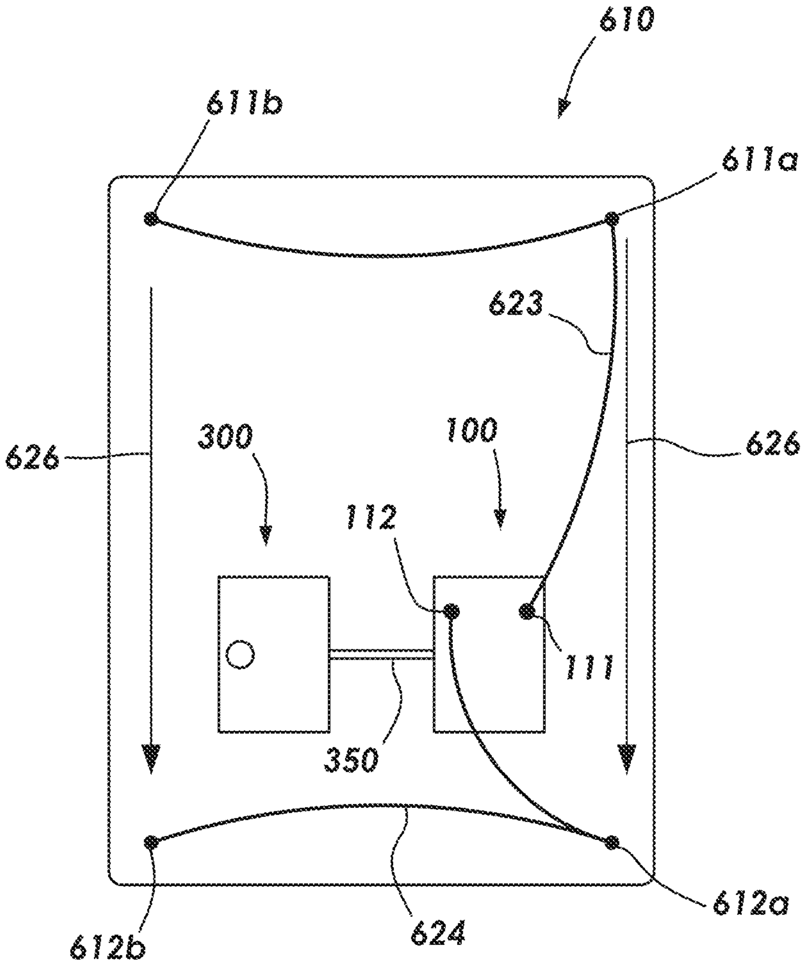
FIGS. 5A-5C are illustrations of the shock box and the receiver box of FIG. 3 attached to a stun vest according to certain other embodiments.
Figure 5C:
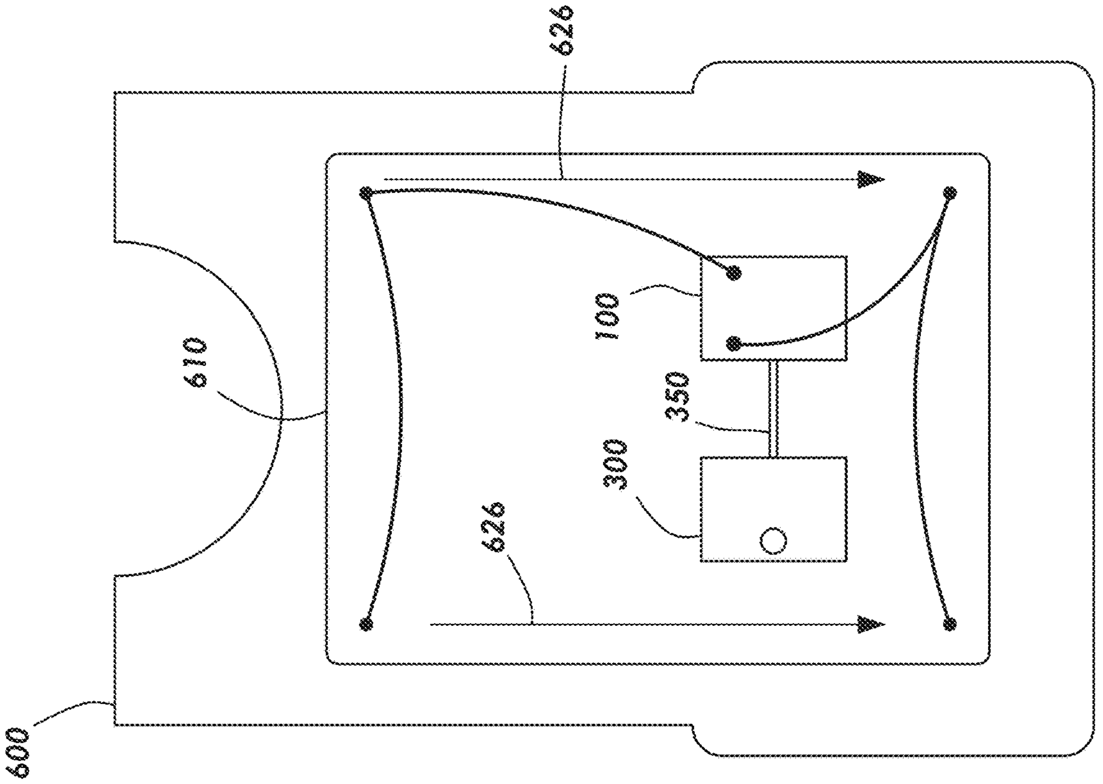
Figure 5B:
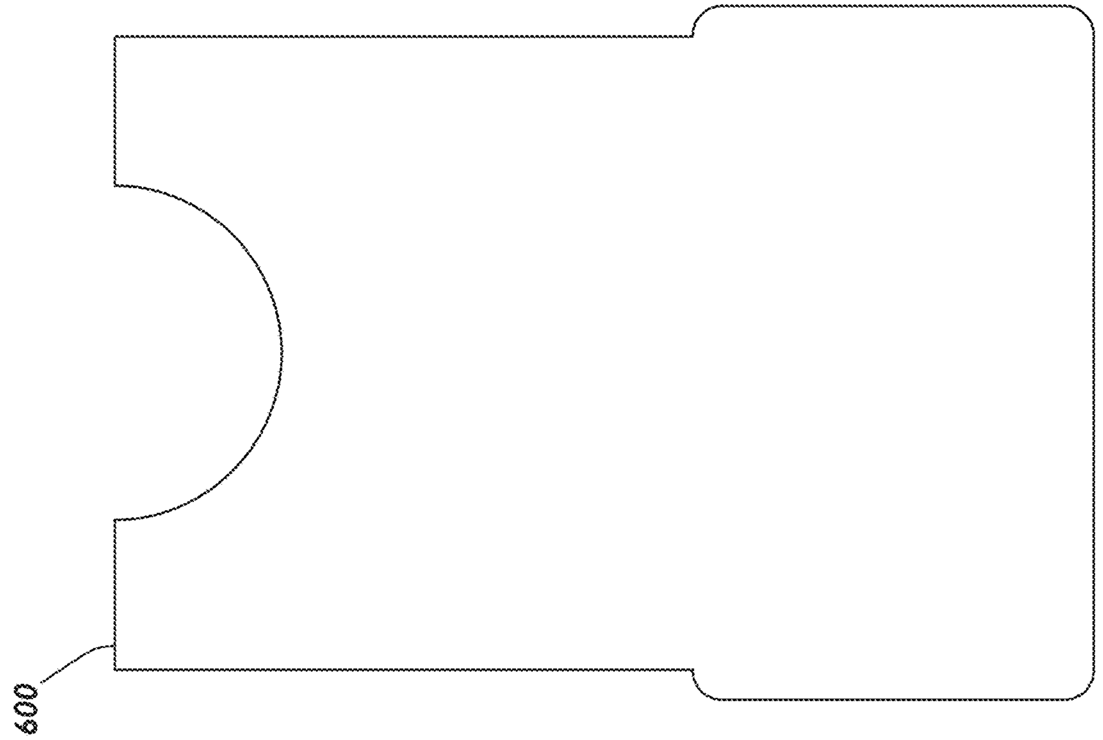
Figure 6:
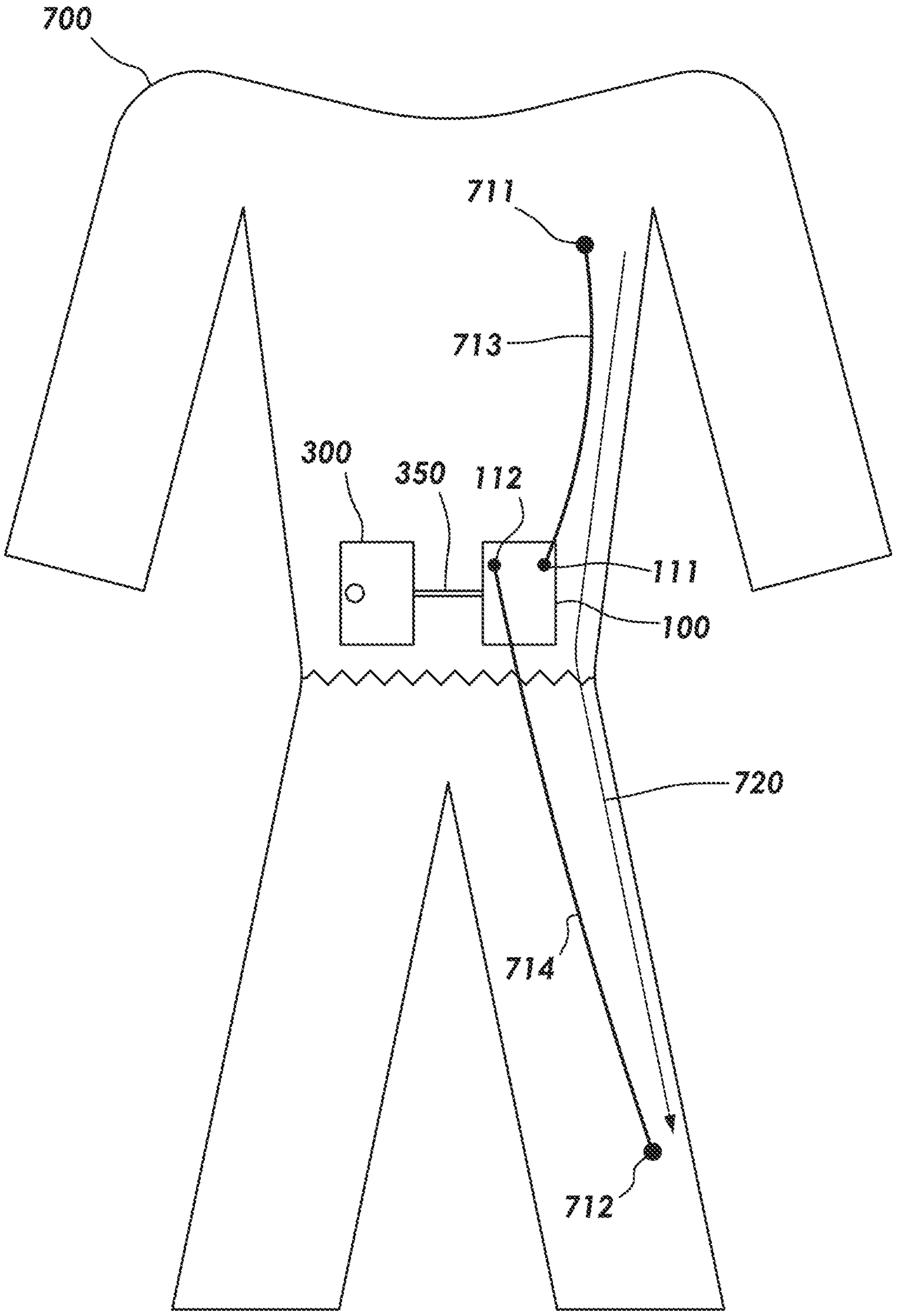
FIG. 6 is an illustration of the shock box and the receiver box of FIG. 3 attached to a jumpsuit according to certain other embodiments.

Turning now to FIGS. 4, 5A-5C, and 6, the stun apparatus includes an article that the shock box 100 is attached to. The article can be clothing apparel. The clothing apparel can be worn by a person, such as an inmate. The clothing apparel can be, for example, a belt 500 as shown in FIG. 4, a vest 600 as shown in FIGS. 5A-5C, or a jumpsuit 700 as shown in FIG. 6. The clothing apparel can also be an arm band, leg band, or other article of clothing that can be worn. The clothing apparel also includes the receiver box 300 located adjacent to the shock box 100 and in communication via the conductor 350.

As can be seen in FIG. 4, the shock box 100 includes the positive terminal 111 and negative terminal 112. The stun belt 500 can be worn around a person's waist or hip area such that the receiver box 300 and shock box 100 are located at the back of the person. When the current is sent to the positive terminal 111, then the current will flow to the negative terminal 112 through the current flow path 510 via the person's body. The stun belt 500 can include VELCRO® or a belt buckle and holes as a way to place around the person's waist or hip area. The belt 500 can also include other components, for example rings or loops, for attaching handcuffs or a chain of handcuffs or leg cuffs.

Turning to FIGS. 5A-5C, the clothing apparel can be a stun vest 600. A shock panel 610 can include the shock box 100 and the receiver box 300 connected via the conductor 350. The shock panel 610 can include a first positive contact 611*a* and a second positive contact 611*b* that are electrically connected to the positive terminal 111 via a conductor 623.

The first positive contact 611*a* and the second positive contact 611*b* are connected in series as shown but can also be connected in parallel to the positive terminal 111. The shock panel 610 can also include a first negative contact 612*a* and a second negative contact 612*b* that are electrically connected to the negative terminal 112 via a conductor 624. The first negative contact 612*a* and the second negative contact 612*b* are connected in series as shown but can also be connected in parallel to the negative terminal 112.

The shock panel 610 can be coupled to a back side of the vest 600. The stun vest 600 can further include a front side and left and right sides. The vest 600 can include strips of a material, such as VELCRO®, that extend from the back side to the front side or vice versa over the person's shoulders for adorning the vest. The vest can also be configured to be placed over a person's head and then secured around the sides of the vest instead of over the person's shoulders. Other ways to place the vest onto a person and remove the vest from the person can also be used.

The positive contacts 611*a*/611*b* and the negative contacts 612*a*/612*b* can be made from an electrically conductive material. The positive contacts 611*a*/611*b* and the negative contacts 612*a*/612*b* can be in direct contact with the person's skin or in indirect contact with the person's skin with a material, such as material of a T-shirt or shirt, being located between the contacts and the skin. In practice, when the activation button(s) on the remote-control transmitter 400 are pressed, the current flows from the output contact of the gas discharge tube 115 to the positive terminal 111 and through the conductor 623 to the positive contacts 611*a*/611*b*, and then through the person's body such as the skin and/or tissues via the current flow paths 626 to the negative contacts 612*a*/612*b* and then to the negative terminal 112 via the conductor 624. The potential energy delivered to the positive contacts 611*a*/611*b* upon activation, causes current to arc from the positive contacts 611*a*/611*b* to the person's skin (even if the positive contacts and the person's skin are separated by clothing worn by the person). Moisture in the person's body enables the current to flow through the body. The potential energy delivered through the person's body to proximate the negative contacts 612*a*/612*b* causes current to arc from the person's skin to the negative contacts 612*a*/612*b* (even if the negative contacts and the person's skin are separated by clothing worn by the person). The potential energy can travel to the negative terminal 111 via the conductor 624 to complete the circuit.

According to any of the embodiments as shown, the first positive contact 611*a* can be located adjacent to the person's right shoulder blade, the second positive contact 611*b* can be located adjacent to the person's left shoulder blade, the first negative contact 612*a* can be located adjacent to the person's right kidney, and the second negative contact 612*b* can be located adjacent to the person's left kidney. According to these embodiments, the current flow paths 626 through the person's body will be a first flow path from the right shoulder blade to the right kidney and a second flow path from the left shoulder blade to the left kidney. According to other embodiments, the first positive contact 611*a* can be located adjacent to the person's right shoulder blade, the first negative contact 612*a* can be located adjacent to the person's left shoulder blade, the second positive contact 611*b* can be located adjacent to the person's right kidney, and the second negative contact 612*b* can be located adjacent to the person's left kidney. The current flow paths 626 according to this embodiment will be a first flow path across the person's upper back from the right shoulder blade to the left shoulder blade and a second flow path across the person's lower back from the right kidney to the left kidney. Other configurations are also possible. The shock panel 610 can also include only one positive contact and one negative contact instead of 2 contacts each. The one positive contact can be located at the person's left or right shoulder blade and the one negative contact can be located at the person's left or right kidney for example. There will only be one current flow path through the person's body either vertically from shoulder blade to kidney or diagonally from shoulder blade to kidney. Of course, the positive and negative contacts can be reversed such that the current flow path(s) are from the person's lower back to the upper back.

Turning to FIG. 6, the clothing apparel can also be a jumpsuit 700. The operation of the components of the jumpsuit embodiments is the same as discussed for the stun vest. As can be seen, the shock box 100 and the receiver box 300 connected via the conductor 350 can be attached to the jumpsuit 700 at the back of the waist area of the person, for example via pockets. A positive contact 711 as discussed above, can be located near the person's upper back, for example near the right or left shoulder blade or in the middle between the shoulder blades, and electrically connected to the positive terminal 111 via a conductor 713. A negative contact 712 can be located on a pants portion of the jumpsuit 700, for example near the person's right or left calf, and electrically connected to the negative terminal 112 via a conductor 714. When the electrical current is sent to the positive terminal 111, the current will then flow to the positive contact 711 via the conductor 713, then through the person's body via a current flow path 720 to the negative contact 712, and then to the negative terminal 112 via the conductor 714.

There can be more than one positive and negative contact; however, the number of positive and negative contacts that are included in the clothing apparel can be selected based a desired current path through the person's body. It is to be understood that there must be at least one negative contact and at least one positive contact included. The total number of positive and negative contacts can also be in multiples of 2. Accordingly, if there is 1 positive contact, then there can be 1 negative contact (2 total); if there are 2 positive contacts, then there can be 2 negative contacts (4 total); if there are 3 positive contacts, then there can be 3 negative contacts (6 total), and so forth. It is also possible to have only one positive contact but two or more negative contacts; however, the current in this scenario will flow to the negative contact that has the least resistance and accordingly, the current may not flow to both of the negative contacts. It is also possible to have only one negative contact and two or more positive contacts. This embodiment may be useful to ensure current flows from both positive contacts to the one negative contact.

The stun belt, vest, or jumpsuit can include a variety of components, for example, straps, zippers, etc. that allow the vest and belt to be placed on a person; or rings or loops for securing hand or leg cuffs or chains to the rings or loops. The clothing apparel can come in different sizes, for example, small, medium, large, X-large, etc.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words “comprise,” “have,” “include,” and all grammatical variations thereof are each intended to have an open, non-limiting meaning that does not exclude additional elements or steps. While apparatus, systems, and methods are described in terms of “comprising,” “containing,” or “including” various components or steps, the apparatus, systems, and methods also can “consist essentially of” or “consist of” the various components and steps. It should also be understood that, as used herein, “first,” “second,” and “third,” are assigned arbitrarily and are merely intended to differentiate between two or more contacts, handles, conductors, etc., as the case may be, and do not indicate any sequence. Furthermore, it is to be understood that the mere use of the word “first” does not require that there be any “second,” and the mere use of the word “second” does not require that there be any “third,” etc.

Whenever a numerical range with a lower limit and an upper limit is disclosed, any number and any included range falling within the range is specifically disclosed. In particular, every range of values (of the form, “from about a to about b,” or, equivalently, “from approximately a to b,” or, equivalently, “from approximately a-b”) disclosed herein is to be understood to set forth every number and range encompassed within the broader range of values. Also, the terms in the claims have their plain, ordinary meaning unless otherwise explicitly and clearly defined by the patentee. Moreover, the indefinite articles “a” or “an,” as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A stun apparatus comprising:

a shock box, wherein the shock box comprises:

a housing;

a positive terminal;

a negative terminal; and a gas discharge tube comprising an input contact electrically coupled to an energy supply device and an output contact electrically coupled to the positive terminal, wherein when a voltage at the input contact becomes equal to or greater than a predetermined threshold voltage, an electrical current arcs within the gas discharge tube from the input contact to the output contact and causes an energy pulse to be delivered to the positive terminal or to a positive contact via the positive terminal, and wherein the shock box is configured to cause current to flow to the negative terminal or a negative contact through a person’s body; and an article, wherein the shock box is attached to the article, wherein the article is clothing apparel.

2. The stun apparatus according to claim 1, further comprising a receiver box, wherein the receiver box is electrically coupled to the shock box via a conductor.

3. The stun apparatus according to claim 2, wherein the energy supply device is housed within the receiver box.

4. The stun apparatus according to claim 2, wherein the receiver box houses an antenna and a transceiver whereby the receiver box communicates wirelessly with a remote-control transmitter.

5. The stun apparatus according to claim 4, wherein the remote-control transmitter comprises:

a transceiver that receives from and transmits to the receiver box via the antenna and transceiver of the receiver box to transfer operational codes, pairing codes, or activation commands therebetween; and an activation button, wherein upon depression of the activation button, a signal is sent to the receiver box.

6. The stun apparatus according to claim 5, wherein the remote-control transmitter is paired with the receiver box such that the wireless communication occurs between the remote-control transmitter and the receiver box.

7. The stun apparatus according to claim 6, wherein an initial pairing of the remote-control transmitter to the receiver box is used to link the remote-control transmitter with the receiver box.

8. The stun apparatus according to claim 7, wherein after the initial pairing of the remote-control transmitter to the receiver box, a new pairing code is generated after each use from the receiver box and transmitted via the transceiver to the remote-control transmitter; and wherein upon depression of the activation button, the remote-control transmitter transmits the new code it received back to the receiver box, whereby the receiver box confirms that the code sent back matches the code it generated, and whereby if the codes match, then the receiver box supplies energy to and sends the signal to the shock box.

9. The stun apparatus according to claim 4, wherein a frequency used to wirelessly communicate from the remote-control transmitter to the receiver box is 900 MHz.

10. The stun apparatus according to claim 5, wherein the clothing apparel is selected from a belt, a vest, or a jumpsuit.

11. The stun apparatus according to claim 10, wherein the belt is configured to be worn around a person’s waist or hip area such that the receiver box and shock box are located at the back of the person, and wherein when the electrical current is sent to the positive terminal, then the current will flow to the negative terminal through a current flow path via the person’s body.

12. The stun apparatus according to claim 10, wherein the vest or the jumpsuit further comprises a first positive contact electrically connected to the positive terminal via a positive conductor; and a first negative contact electrically connected to the negative terminal via a negative conductor.

13. The stun apparatus according to claim 12, wherein the first positive contact and the first negative contact are made from an electrically conductive material, and wherein the contacts are configured to be in direct contact with the person’s skin or indirect contact with the person’s skin via a cloth material.

14. The stun apparatus according to claim 13, wherein the stun apparatus is configured such that the current flows from an output contact of the gas discharge tube to the positive terminal and through the positive conductor to the first positive contact, and then through the person’s body via a current flow path to the negative contact, and then to the negative terminal via the negative conductor.

15. The stun apparatus according to claim 12, further comprising a second positive contact electrically coupled to the positive terminal or the first positive contact via the positive conductor, a second negative contact electrically coupled to the negative terminal or the first negative contact via the negative conductor, or both a second positive contact and a second negative contact.

16. A stun shield comprising:

a shock box, wherein the shock box comprises:

a housing;

a positive terminal;

a negative terminal; and a gas discharge tube comprising an input contact electrically coupled to an energy supply device and an output contact electrically coupled to the positive terminal, wherein when a voltage at the input contact becomes equal to or greater than a predetermined threshold voltage, an electrical current arcs within the gas discharge tube from the input contact to the output contact and causes an energy pulse to be delivered to the positive terminal or to a positive contact via the positive terminal, and wherein the shock box is configured to cause current to flow to the negative terminal or a negative contact through a person's body; and the stun shield, wherein the shock box is attached to the stun shield, and wherein the stun shield comprises conductive strips, wherein a first set of strips form a positive current path, and wherein a second set of strips form a negative current path.

17. The stun shield according to claim 16, wherein the energy supply device is housed within the shock box.

18. The stun shield according to claim 16, wherein the stun shield is made from a transparent material.

19. The stun shield according to claim 16, wherein the stun shield further comprises a handle, and wherein the shock box is electrically coupled to an activation switch that is located on the handle via a conductor.

20. The stun shield according to claim 16, wherein an arc point is located between a space between the positive current path and the negative current path, and wherein the arc point is configured such that when a person touches or comes within an arc distance of a portion of the strips of both the positive current path and the negative current path, then the electrical current arcs through the person's body and flows through the negative current path to the negative terminal.

* * * * *